(12) United States Patent
Malkamäki

(10) Patent No.: US 7,289,452 B2
(45) Date of Patent: Oct. 30, 2007

(54) TRANSPORT BLOCK SIZE (TBS) SIGNALING ENHANCEMENT

(75) Inventor: Esa Malkamäki, Espoo (FI)

(73) Assignee: Nokia Corporation, Espoo (FI)

( * ) Notice: Subject to any disclaimer, the term of this patent is extended or adjusted under 35 U.S.C. 154(b) by 1082 days.

(21) Appl. No.: 10/287,810

(22) Filed: Nov. 5, 2002

(65) Prior Publication Data

US 2004/0081181 A1 Apr. 29, 2004

Related U.S. Application Data

(60) Provisional application No. 60/420,782, filed on Oct. 24, 2002.

(51) Int. Cl.
*G01R 31/08* (2006.01)

(52) U.S. Cl. .................. 370/252; 370/466; 714/748

(58) Field of Classification Search .................. None
See application file for complete search history.

(56) References Cited

U.S. PATENT DOCUMENTS

| 5,551,064 | A | 8/1996 | Nobbe et al. |
| 5,805,982 | A | 9/1998 | Hulsebosch |
| 6,052,596 | A | 4/2000 | Barnickel |
| 6,252,861 | B1 | 6/2001 | Bernstein et al. |
| 6,385,437 | B1 | 5/2002 | Park et al. |
| 6,418,317 | B1 | 7/2002 | Cuffaro et al. |
| 6,546,252 | B1 | 4/2003 | Jetzek et al. |
| 6,807,192 | B2 * | 10/2004 | Terry ..................... 370/469 |
| 7,113,496 | B2 * | 9/2006 | Koo et al. ................ 370/335 |
| 2001/0033582 | A1 * | 10/2001 | Sarkkinen et al. .......... 370/474 |

OTHER PUBLICATIONS

"LS on Transport Block Size Signalling" 3GPP TSG RAN WG1 Meeting, R1-02-1456, Nov. 8, 2002, 2 pages.
"Transport Block Size Set Definition and Signalling for HSDPA", 3GPP TSG-RAN WG1#29, R1-02-1327, Nov. 4, 2002, 3 pages.
"LS on Transport Block Size Signalling" 3GPP TSG RAN WG1 Meeting, R1-02-1456, date uncertain, 2 pages.

* cited by examiner

*Primary Examiner*—Duc Ho
(74) *Attorney, Agent, or Firm*—Lackenbach Siegel, LLP; Robert M. Bauer, Esq.

(57) ABSTRACT

A method signals the transport block size in wireless communications. First, information including a first information indicating a transport block size, the first information indicating a transport block size being a set number of bits, is transmitted. Then, a packet using the transport block size indicated by the first information is transmitted. The packet is retransmitted using a second information indicating a transport block size, the second information indicating a transport block size being a set number of bits, wherein if the second information indicates an invalid transport block size, the transport block size indicated by the first information is used in the retransmission.

37 Claims, 1 Drawing Sheet

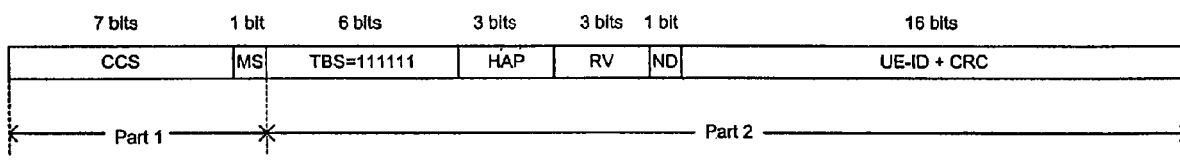

CCS = channellisation code set
MS = modulation scheme
TBS = transport block size
HAP = hybrid ARQ process Id
RV = redundancy and constellation version
ND = new data indicator
UE-ID + CRC = user equipment identity + cyclic redundancy check

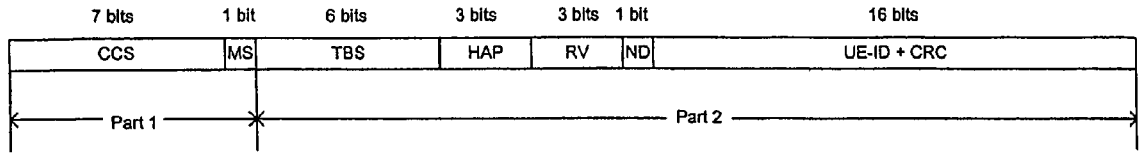

CCS = channellisation code set
MS = modulation scheme
TBS = transport block size
HAP = hybrid ARQ process id
RV = redundancy and constellation version
ND = new data indicator
UE-ID + CRC = user equipment identity + cyclic redundancy check

FIG. 1 - PRIOR ART

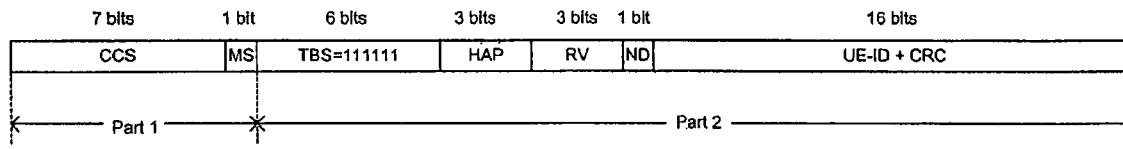

CCS = channellisation code set
MS = modulation scheme
TBS = transport block size
HAP = hybrid ARQ process id
RV = redundancy and constellation version
ND = new data indicator
UE-ID + CRC = user equipment identity + cyclic redundancy check

FIG. 2

TRANSPORT BLOCK SIZE (TBS) SIGNALING ENHANCEMENT

This application claims the priority of Provisional Application Ser. No. 60/420,782; which was filed on Oct. 24, 2002.

BACKGROUND

1. Field of the Invention

The invention relates to wireless communications. In particular, the invention relates to transport block size (TBS) signaling in wireless communications.

2. Background Information

In systems that include mobile devices, packets are generally sent using one of many modulation schemes. All packets sent during a given transfer generally conform to the same transport block size (TBS). The sender of the packets sends information telling the receiver the modulation scheme and transport block size, among other things, before the packets are sent. Therefore, once the packets are sent, the receiver knows the modulation scheme, the number of multicodes, and the transport block size of the packets and, therefore, can correctly decipher and receive the information.

Proposals have been made about increasing the number of bits allocated for the definition of the transport block size (currently 6 bits) to allow for a higher resolution. These proposals have been particularly common with those involved in Third Generation Partnership Project (3GPP) standardization work. Specifically, those individuals working in areas related to Wideband Code Division Multiple Access (WCDMA) and High Speed Downlink Packet Access (HSDPA). In HSDPA, the TBS field is placed, along with other information, in the high-speed shared control channel (HS-SCCH). FIG. 1 shows a diagram of an example allocation of HS-SCCH signaling bits.

In Release 5 of the 3GPP specifications, the TBS is signaled on HS-SCCH using a 6 bit TBS field. The meaning of these bits is tied to the modulation scheme as well as the number of channelisation codes. See 3GPP TS 25.321 v5.2.0 (2002-09), which is hereby incorporated by reference in its entirety, particularly Section 9.2.3 directed to signaling of Transport Block Size.

The transport block size (TBS) has to be the same for the first transmission and the retransmissions, since the information content has to be the same. The retransmissions can use different redundancy version (RV), i.e., different coding, different number of channelisation codes (small changes currently allowed). The TBS is signalled for each retransmission on the HS-SCCH along with the modulation scheme, channelisation code set, redundancy version and other HARQ parameters.

There is some overlap in the TBS between different modulation schemes and theoretically the modulation scheme can be changed in some special cases, but in practice it is not possible to change the modulation for the retransmissions. This can be a problem if the first transmission is done with 16QAM and, due to bad channel characteristics, QPSK would be better for retransmissions.

The problem has not yet been adequately solved. In one 3GPP proposal, a 7 bit TBS field was proposed for QPSK and a 6 bit TBS field was proposed for 16QAM. See 3GPP Tdoc R1-02-1045.

Another proposal is a mapping of the transport block sizes through a logarithmic conversion to minimize the worst-case relative padding in case the MAC-PDU is not of the exactly same size as the available transport block sizes. This is discussed in document R2-0221668, entitled "Signaling of Transport Block Sizes for HS-DSCH" (Ericsson). However, this approach assumes a fixed number of bits for the signaling of the transport block size, and the transport block sizes are dependent on the modulation and multicode setting. Therefore, in cases where a packet is transferred and an error has occurred and retransmission is requested, the retransmission according to this approach must occur using the same modulation scheme. Thus, a transmitting device (e.g., base station) cannot freely select a modulation scheme whenever a retransmission is required.

It is also possible that, since the TBS is always the same, there is no need to signal it always with the retransmissions (provided that the UE has received the HS-SCCH correctly for the first transmission) and the TBS could be ignored by the UE for the retransmissions. Thus, the Node B could change the modulation scheme and the number of channelisation codes freely for the retransmission and this type of operation mode could be switched on/off by higher layer signaling. The problem with this proposal is that if the UE does not receive the first transmission correctly, it does not get the TBS at all (since it may be nonsensical in the retransmissions if the Node B has changed the modulation or the number of channelisation codes) and the TB is lost.

BRIEF DESCRIPTION OF THE DRAWINGS

The present invention is further described in the detailed description which follows in reference to the noted plurality of drawings by way of non-limiting examples of embodiments of the present invention wherein:

FIG. 1 is a diagram of an example allocation of HS-SCCH signaling bits;

FIG. 2 is a diagram of an allocation of HS-SCCH signaling bits according to a preferred embodiment of the invention;

DETAILED DESCRIPTION

Wireless communications systems are well known in the art. In general, the system consists of at least one base station controller and a plurality of base stations (referred to as "Node B" in the 3GPP specifications) each transmitting information, including signaling information, to a plurality of mobile stations (i.e., User Equipment). The signaling information includes a transport block size, redundancy version, modulation mode, and number of multicodes. Once the mobile device receives this information, the mobile device knows that the modulation scheme and transport block size of any packets that are subsequently transferred. This information may be used to appropriately receive the packets. The mobile device uses the correct modulation scheme and knows how to decode the transport block size based on the modulation scheme. Details of a wireless communications system according to the 3GPP specification are described in the documents listed in Section 2 of 3GPP TD 25.321 v5.2.0 (2002-09), which documents are hereby incorporated by reference.

The preferred embodiments of the invention relate to a method and system for transport block size signaling based on modulation type and multicodes on HS-SCCH (Shared Control Channel for High Speed Downlink Packet Access (HSDPA)). In particular, the embodiments relate to an enhancement to the specifications set forth in Section 9.2.3 of 3GPP TS 25.321 v5.2.0 (2002-09). However, the invention is not limited in its application to the embodiments described in this application and may be applied in several environments, Wideband Code Division Multiple Access (WCDMA), etc.

In the preferred embodiments of the invention, one of the TBS indexes is reserved to indicate an "invalid" TBS. For instance, a TBS consisting of all ones (111111), which conventionally indicates the highest code rate, can be used for this purpose. The TBS field may have a conventional value whenever it is possible to signal it with the conventional method. If the Node B wants to change the modulation scheme or the number of channelisation codes for the retransmission, it is allowed to do that and then the reserved TBS field (e.g., 111111) is used to indicate that the TBS is not valid in this transmission (see FIG. 2) and the TBS of the first transmission should be used. The reserved TBS field can be designated to be any one of the possible values.

If the UE has missed the first transmission (which the Node B typically can notice due to missing ACK/NACK), the Node B can retransmit such that the TBS field is valid and only when the HS-SCCH of the first transmission has been correctly received, change the modulation scheme (if required) and indicate invalid TBS. No higher layer signaling is needed. The one reserved TBS index will tell the UE when the TBS is not valid.

To illustrate the present invention, modulation schemes of quadrature phase shift keying (QPSK) and 16-quadrature amplitude modulation (QAM) will be used in an example. This example allows for the Node B to send for instance the following sequence (first, second, third etc. transmissions of a given transport block):

1. 16QAM, 10 codes with valid TBS index=k (=40) with RV=i
2. QPSK, 10 codes with invalid TBS index=63 (=111111), RV=x
3. QPSK, 8 codes with invalid TBS index=63 (=111111), RV=y
4. 16QAM, 9 codes with valid TBS index=m (=45), RV=z
5. QPSK, 10 codes with invalid TBS index=63 (=111111), RV=w etc.
6. 16QAM, 5 codes with invalid TBS index=63 (=111111), RV=v That is, every time it is possible to have the valid TBS index, it would be used and if not possible, then TBS index=63 (=111111) would be used.

In the above preferred embodiment, TBS index=k for the first transmission and TBS index=m for the fourth transmission should indicate the same transport block size (different index is necessary because the number of channelisation codes has been changed). The redundancy versions RV can have any allowed values (typically for first transmission RV=0).

In the above example, the first transmission is done with 16QAM and 10 channelisation codes using transport block size of 12488 (corresponds to TBS index=40, see TS 25.321 v.5.2.0 for details), i.e., TBS index=40 is signaled. The redundancy version can be, e.g., RV-0.

The second transmission is done with QPSK and 10 codes. Since it is not possible to indicate transport block size of 12488 when QPSK and 10 codes are used (the maximum possible TBS that can in this case be indicated is 9377 with TBS index=62), TBS index=63 is signalled to indicate that the transport block size of the first transmission (i.e., 12488) should be used instead.

The third transmission is done with QPSK and 8 codes. Again the actual TBS cannot be indicated with TBS index and TBS index=63 is signaled. The UE uses the actual TBS of 12488 signalled with the first transmission for decoding of the third transmission.

The fourth transmission is done with 16QAM and 9 codes. Although the number of code channels is not the same as for the first transmission, it is possible to signal the actual TBS of 12488 using TBS index=45.

The fifth transmission is again with QPSK and 10 codes. Again TBS index=63 has to be signaled.

The sixth transmission is done with 16QAM and 5 codes. Here again TBS index=63 has to be signalled since it is not possible to indicate the actual TBS.

The transport block size always has to be the same in the retransmission and thus the TBS of the first transmission is always used (not only when the TBS index=63). The TBS is signaled with every transmission because the mobile station may have lost the first transmission. The preferred embodiments of the invention allows the number of channel bits to be be changed for the retransmission such that the TBS cannot be signaled anymore and in this case the TBS index=63 should be used. Otherwise, the mobile station can use the TBS signaled with the transmission (if the TBS signaled with the retransmission is different from the TBS signaled with the first transmission, then there is error somewhere: either signaling information has changed in one of the transmissions or the mobile station is trying to combine two transmission which are not transmission of the same data block.

In a modified embodiment, more bits can be used for TBS signaling in order to have more or total overlap between the TBS of QPSK and 16QAM modulation schemes. The extra bit(s) expands the operation range of the transport block size signaling.

FIG. 2 shows a diagram of allocation of HS-SCCH signaling bits according to an example embodiment of the present invention. According to the present invention, the channelization code set may be represented by seven bits, the modulation scheme represented by one bit, the H-ARQ process number represented by three bits, the new data indicator represented by one bit, and the CRC (cyclic redundancy check) may be represented by 16 bits.

If a base station transfers signaling signifying a modulation mode of 16-QAM, and then transmits packets to a mobile device where one or more of the packets are received in error, the base station may retransmit that particular erroneous packet changing the modulation mode to QPSK. Therefore, according to the present invention, packets originally transmitted using one modulation mode may be retransmitted using a different modulation mode than that used to transmit the original packet. The originally packet may be retransmitted for many reasons, such as being received with errors or problems. A base station may decide to change modulation modes for any number of reasons. For example, a particular modulation mode may be less sensitive to transmission errors for a given set of conditions, channel conditions may have changed since the original transmission, the receiver (mobile device) signal power is lower for a specific modulation scheme or set of conditions, etc.

As noted previously, a previous specification for transport block signaling is described in 3GPP TS 25.321 v5.2.0 (2002-09) and various other proposals for transport block size signaling have been made. The methods and systems of a preferred embodiment of the present invention are an adaptation or modification of that previously described in the 3GPP specifications. The following is a textual modification of Section 9.2.3 to conform it to the preferred embodiments of the present invention. The text below is copied from, or similar to, the text that already exists in the document, modified to conform the document to the preferred embodiments.

Modifications to TS-25.321 Section 9.2.3

Changes to the following text from 3GPP TS 25.321 v5.2.0 are identified by vertical lines in the right hand margin. Additions are indicated by underlining in the text and the deletions are indicated by strikethroughs in the text.

9.2.3 Signalling of Transport Block size for HS-DSCH

For HS-DSCH the transport block size is derived from the TFRI value signalled on the HS-SCCH. The mapping between the TFRI value and the transport block size for each mode is specified below:

9.2.3.1 Transport Block Size for FDD

For each combination of channelization code set and modulation scheme i=0 . . . 31, a set of $k_i$=0 . . . 62 transport block sizes $L(i, k_i)$ is given by:

If i=0 and $k_i$<39
  $L(i, k_i) = 137 + 12k_i$
  $k_i = 0, \ldots, 38$
else
  $L(i, k_i) = \lfloor L_{min} p^{k_{0,i} k_i} \rfloor$
  p=2085/2048
  $L_{min}$=296
  $K_{0,i}$=from Table 9.2.3.1
  $k_i = 0, \ldots, 62$
end $k_i$=63, i.e., the all ones transport block size index is used to indicate an invalid transport block size and that the transport block size of an earlier transmission should be used instead (this is typically only used for retransmissions). The 'if' statement above is true only for a single channelization code using QPSK modulation. The index $k_i$ of the transport block size $L(i, k_i)$ corresponds to the 6 bit transport block size index signaled on the HS-SCCH. The index i corresponds to the combination of code set and modulation scheme as defined in Table 9.2.3.1.

TABLE 9.2.3.1

Values of $k_{0,i}$ for different numbers of channelization codes and modulation schemes

| Combination i | Modulation scheme | Number of channelization codes | $k_{0,i}$ |
|---|---|---|---|
| 0 | QPSK | 1 | 1 |
| 1 | | 2 | 40 |
| 2 | | 3 | 63 |
| 3 | | 4 | 79 |
| 4 | | 5 | 92 |
| 5 | | 6 | 102 |
| 6 | | 7 | 111 |
| 7 | | 8 | 118 |
| 8 | | 9 | 125 |
| 9 | | 10 | 131 |
| 10 | | 11 | 136 |
| 11 | | 12 | 141 |
| 12 | | 13 | 145 |
| 13 | | 14 | 150 |
| 14 | | 15 | 153 |
| 15 | 16QAM | 1 | 40 |
| 16 | | 2 | 79 |
| 17 | | 3 | 102 |
| 18 | | 4 | 118 |
| 19 | | 5 | 131 |
| 20 | | 6 | 141 |
| 21 | | 7 | 150 |
| 22 | | 8 | 157 |

TABLE 9.2.3.1-continued

Values of $k_{0,i}$ for different numbers of channelization codes and modulation schemes

| Combination i | Modulation scheme | Number of channelization codes | $k_{0,i}$ |
|---|---|---|---|
| 23 | | 9 | 164 |
| 24 | | 10 | 169 |
| 25 | | 11 | 175 |
| 26 | | 12 | 180 |
| 27 | | 13 | 184 |
| 28 | | 14 | 188 |
| 29 | | 15 | 192 |

9.2.3.2 Transport Block Size for 3.84 Mcps TDD

Let k be the signalled TFRI value, then the corresponding HS-DSCH transport block size $L_k$ is given by:

If k=1 . . . 510
  $L_k = \lfloor L_{min} p^k \rfloor$ $$p = \frac{8313}{8192}$$

$L_{min}$=57
If k=511
  $L_k$=102000

If k=0, $L_k$ indicates NULL and shall not be used to signal a transport block size in the TFRI. Instead k=0 shall be used to signal that the transport block size of an earlier transmission of the same transport block should be used instead (this is typically only used for retransmissions).

9.2.3.3 Transport Block Size for 1.28 Mcps TDD

The mapping of transport block size, in bits, to TFRI value is dependent upon the UE's HS-DSCH capability class. The mapping between TFRI value, i, and the transport block size, $L_i$, is specified by the following:

$L_0$=NULL i=0,
$L_i = \lfloor 10^{a+(i-1)(b-a)/62} \rfloor$ i=1, 2, . . . ,63 where
i=the transport block index,
a=$\log_{10}(TBS_{min})$,
b=$\log_{10}(TBS_{max})$,
and
$TBS_{min}$=240,
$TBS_{max}$=the maximum transport block size that is supported by the UE class, which has the value 7016 for 1.4 Mb/s,
10204 for 2.0 Mbps and
14056 for 2.8 Mb/s.

The NULL value (corresponding to index i=0) is not signalled to the UE. It can be used by the UE in the Recommended Transport Block Size field of the CQI to signal that no available transport block size could have been used by the Node B to meet the specified target quality for the HS-DSCH. Instead i=0 shall be used to signal to the UE that the transport block size of an earlier transmission of the same transport block should be used instead (this is typically only used for retransmissions).

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for transport block size signaling comprising:
    transmitting information including a first information indicating a transport block size, the first information indicating a transport block size being a set number of bits;
    transmitting a packet using the transport block size indicated by said first information; and
    retransmitting said packet using a second information indicating a transport block size, the second information indicating a transport block size being a set number of bits,
    wherein, if the second information indicates an invalid transport block size, then the transport block size indicated by the first information is used in the retransmission.

2. The method according to claim 1, wherein the invalid transport block size is indicated by a predefined TBS index.

3. The method according to claim 1, wherein the invalid transport block size is indicated by information comprising bits which are all ones or bits which are all zeros.

4. The method according to claim 1, wherein the first information and second information indicating the transport block size comprise 6 bits.

5. The method according to claim 1, further comprising performing the transmitting information, the transmitting the packet, and the re-transmitting the packet between a base station and a mobile device in a wireless communication system.

6. The method according to claim 1, further comprising performing the transmitting information, the transmitting the packet, and the re-transmitting the packet between a base station and a mobile device in a 3G wireless communication system.

7. The method according to claim 1, further comprising performing the transmitting information, the transmitting the packet, and the re-transmitting the packet between a base station and mobile device in a wireless communication system implementing High Speed Downlink Packet Access (HSDPA).

8. A wireless communication system comprising:
    a base station; and
    at least one mobile device,
    wherein the base station transmits information by:
    transmitting information including a first information indicating a transport block size, the first information indicating a transport block size being a set number of bits;
    transmitting a packet using the transport block size indicated by said first information; and
    retransmitting said packet using a second information indicating a transport block size, the second information indicating a transport block size being a set number of bits,
    wherein, if the second information indicates an invalid transport block size, then the transport block size indicated by the first information is used in the retransmission.

9. A wireless communication system according to claim 8, wherein the invalid transport block size is indicated by a predefined TBS index.

10. A wireless communication system according to claim 8, wherein the invalid transport block size is indicated by information comprising bits which are all ones or bits which are all zeros.

11. A wireless communication system according to claim 8, wherein the first information and second information indicating the transport block size comprise 6 bits.

12. A wireless communication system according to claim 8, wherein the wireless communication system is a 3G wireless communication system.

13. A wireless communication system according to claim 8, wherein the wireless communication system is implementing High Speed Downlink Packet Access (HSDPA).

14. A base station in a wireless communication system, said base station transmitting information by:
    transmitting information including a first information indicating a transport block size, the first information indicating a transport block size being a set number of bits;
    transmitting a packet using the transport block size indicated by said first information; and
    retransmitting said packet using a second information indicating a transport block size, the second information indicating a transport block size being a set number of bits,
    wherein, if the second information indicates an invalid transport block size, then the transport block size indicated by the first information is used in the retransmission.

15. A base station according to claim 14, wherein the invalid transport block size is indicated by a predefined TBS index.

16. A base station according to claim 14, wherein the invalid transport block size is indicated by information comprising bits which are all ones or bits which are all zeros.

17. A base station according to claim 14, wherein the first information and second information indicating the transport block size comprise 6 bits.

18. A base station according to claim 14, wherein the wireless communication system is a 3G wireless communication system.

19. A base station according to claim 14, wherein the wireless communication system is implementing High Speed Dowulink Packet Access (HSDPA).

20. A user terminal in a wireless communication system, said user terminal receiving information from a base station by:
    receiving information including a first information indicating a transport block size, the first information indicating a transport block size being a set number of bits;
    receiving a packet using the transport block size indicated by said first information; and
    receiving said packet a second time using a second information indicating a transport block size, the second information indicating a transport block size being a set number of bits,
    wherein, if the second information indicates an invalid transport block size, then the transport block size indicated by the first information is used when receiving said packet a second time.

21. A user terminal according to claim 20, wherein the invalid transport block size is indicated by a predefined TBS index.

22. A user terminal according to claim 20, wherein the invalid transport block size is indicated by information comprising bits which are all ones or bits which are all zeros.

23. A user terminal according to claim 20, wherein the first information and second information indicating the transport block size comprise 6 bits.

24. A user terminal according to claim 20, wherein the wireless communication system is a 3G wireless communication system.

25. A user terminal according to claim 20, wherein the wireless communication system is implementing High Speed Downlink Packet Access (HSDPA).

26. A transmission circuit in a base station, said transmission circuit causing said base station to transmit information by:
   transmitting information including a first information indicating a transport block size, the first information indicating a transport block size being a set number of bits;
   transmitting a packet using the transport block size indicated by said first information; and
   retransmitting said packet using a second information indicating a transport block size, the second information indicating a transport block size being a set number of bits,
   wherein, if the second information indicates an invalid transport block size, then the transport block size indicated by the first information is used in the retransmission.

27. A transmission circuit according to claim 26, wherein the invalid transport block size is indicated by a predefined TBS index.

28. A transmission circuit according to claim 26, wherein the invalid transport block size is indicated by information comprising bits which are all ones or bits which are all zeros.

29. A transmission circuit according to claim 26, wherein the first information and second information indicating the transport block size comprise 6 bits.

30. A transmission circuit according to claim 26, wherein the base station is a 3G base station.

31. A transmission circuit according to claim 26, wherein the base station is implementing High Speed Downlink Packet Access (HSDPA).

32. A receiving circuit in a user terminal of a wireless communication system, said receiving circuit causing said user terminal to receive information from a base station by:
   receiving information including a first information indicating a transport block size, the first information indicating a transport block size being a set number of bits;
   receiving a packet using the transport block size indicated by said first information; and
   receiving said packet a second time using a second information indicating a transport block size, the second information indicating a transport block size being a set number of bits,
   wherein, if the second information indicates an invalid transport block size, then the transport block size indicated by the first information is used when receiving said packet a second time.

33. A receiving circuit according to claim 32, wherein the invalid transport block size is indicated by a predefined TBS index.

34. A receiving circuit according to claim 32, wherein the invalid transport block size is indicated by information comprising bits which are all ones or bits which are all zeros.

35. A receiving circuit according to claim 32, wherein the first information and second information indicating the transport block size comprise 6 bits.

36. A receiving circuit according to claim 32, wherein the user terminal is for a 3G wireless communication system.

37. A receiving circuit according to claim 32, wherein the user terminal is implementing High Speed Downlink Packet Access (HSDPA).

* * * * *